F. T. LOMONT & J. O. BROWN.
HARVESTER.
No. 186,858. Patented Jan. 30, 1877.
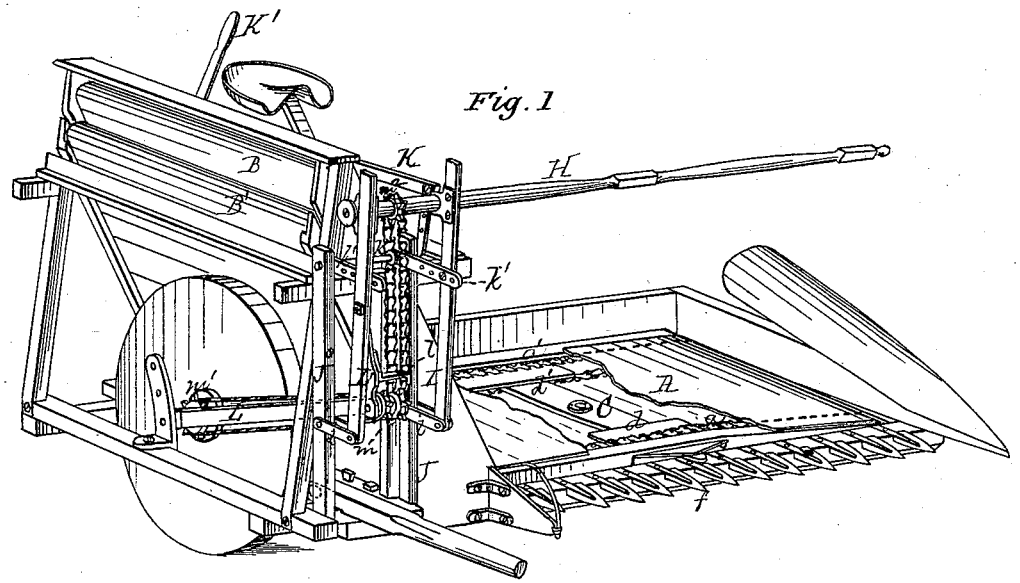
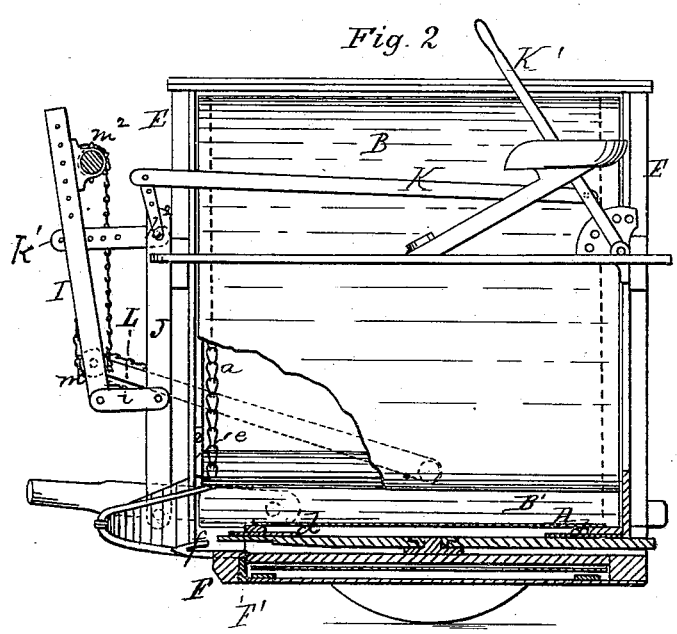
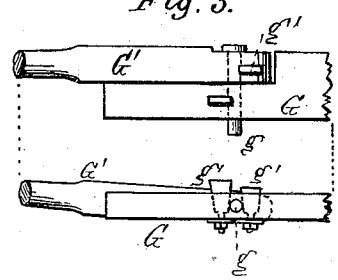
Witnesses:
Alex Mahon
John G. Center
Inventor:
François T. Lomont
James O. Brown
by A. M. Smith
Attorney

UNITED STATES PATENT OFFICE.

FRANÇOIS T. LOMONT AND JAMES O. BROWN, OF MASSILLON, OHIO, ASSIGNORS, BY MESNE ASSIGNMENTS, OF PART OF THEIR RIGHT TO EDWIN BAYLISS, OF SAME PLACE.

IMPROVEMENT IN HARVESTERS.

Specification forming part of Letters Patent No. 186,858, dated January 30, 1877; application filed October 14, 1875.

*To all whom it may concern:*

Be it known that we, FRANÇOIS T. LOMONT and JAMES O. BROWN, both of Massillon, county of Stark, and State of Ohio, have invented certain new and useful Improvements in Harvesters, of which the following is a full, clear, and exact description, reference being had to the accompanying drawings, making part of this specification, in which—

Figure 1 is a perspective view of so much of a harvester as is necessary to show our improvements. Fig. 2 is a grain-side elevation of the elevator, partly broken away, and with the grain-platform in section; and Fig. 3 represents plan and side views of the pivotal tongue-connection with the frame.

Similar letters of reference denote corresponding parts wherever used.

The invention consists in a novel combination of adjustable wedge-pieces with the tongue pivot or bolt, whereby all wear in the socket of said bolt or pivot is compensated for, and lateral play or movement of the parts relatively is prevented, for giving greater steadiness to the machine in operation.

The invention further consists in a novel arrangement of jointed reel supports or standards and reel-driving belts or mechanism, and of the means for adjusting the reel, whereby a vertical adjustment of the reel can be effected by the attendant while the machine is in operation, and without disturbing the working relation of its driving mechanism, as hereinafter explained.

In the accompanying drawings, the machine represented is of that class known as "hand-binders," in which the grain is conveyed by endless platform and elevator-aprons or carriers to an elevated receptacle, from which it is removed and bound by men riding on the machine; and being in its general organization and construction similar to machines of the same type in ordinary use, it will be described in detail only so far as is necessary to an understanding of our improvements.

A represents the platform-apron, and B B' the elevator-aprons, between which the grain is carried up to the binders' grain-receptacle, these aprons being arranged upon end rollers, operated in any usual or preferred way. The ends of these rollers, in front and rear, are provided with notched or grooved pulleys or sprocket-wheels, over which pass endless chains $a$ $a'$, arranged at or near and underneath the front and rear edges, at the front and rear of the overlapping endless aprons, and to the links of these chains the edges of the aprons are united by rivets, loops, or other suitable fastenings, which insure the steady and uniform movement of the aprons or carriers with the chains, to which motion is imparted by the sprocket-wheels or pulleys on the apron-rollers. By this construction of the aprons or carriers the necessity for having them tightly drawn over the rollers is obviated, all the driving-strain falling upon the chains, and the aprons are therefore free to contract or stretch under the action of the atmosphere and the conditions of the grain, whether wet or dry, without impairing or in any way interfering with the action of the apron as a carrier. Underneath the chains $a$ of the platform-apron, where they cross over the sickle-lever C, metal wear-plates $d$ $d'$ are secured to the transverse platform-frame timbers, said plates being interposed between the chains and said lever, for holding the chains up out of contact therewith, and preventing wear upon and interference with the working of said lever. Similar strips $e$, either of wood or metal, as preferred, are connected with the elevator frame or boards E, for taking the wear of the chains of the elevator-aprons and for preventing sagging, in a manner that will be readily understood.

The forward platform sill or bar F, to which the fingers $f$ are secured, has a rabbet formed on its rear vertical face, extending from the bottom of the sill up to a point below the upper surface thereof, about equal to the depth of the finger-shanks, and within this rabbet is secured a metal strip or plate, F', secured flatwise against the back of the sill, and extending the whole length thereof, its upper edge resting underneath against the extended shanks of the fingers, as shown in Fig. 2.

By this construction the sill or finger-bar is materially stiffened against vertical deflection, and may be made much smaller and lighter without impairing its strength, thereby adapting the machine to cut closer to the ground, where the condition of the grain is such as to require it. G represents the gear-plank or main longitudinal frame-timber, cut away at its forward end to receive the rear end of the tongue G', which is connected therewith by a horizontal pivot or bolt, $g$, as shown in Fig. 3. Vertical slots are cut through the tongue and gear-plank—one in front and the other in rear of the pivotal bolt-socket—and in these are secured wedge-shaped pieces $g'$, provided at their lower ends with screw and nut, by means of which they can be drawn snugly into their seats or slots, with their inner adjacent faces pressing against the pivotal bolt from opposite sides, as shown.

By this construction it will be seen that any wear in the bolt-socket can be readily compensated for, and the position of the pivotal bolt relative to the line of draft can be maintained by the adjustment of the wedge-pieces $g'$, thereby preserving the proper relation between the pole and gear-plank, and insuring greater steadiness to the machine in operation.

H is the shaft of the reel, which may be of any usual construction, preferably of that type ordinarily denominated an "overhung" reel, the shaft being supported in bearings at its inner or main-frame side, in uprights or standards I I, connected at their lower ends with the forward elevator-frame posts J J by pivoted links $i$ $i$. In the upper ends of the posts J J a shaft, $k$, is mounted, provided with arms $k^1$ $k^1$, the forward ends of which are pivoted to the upright I, said arms being provided with a number of perforations, by means of which the pivotal connection between them and the uprights can be set nearer to or farther from the rock-shaft $k$, as desired, for varying the throw or relation of the reel.

The grain-side end of the rock-shaft $k$ has a crank-arm, $k^2$, attached, from which a connecting-rod, K, extends back, being connected at its rear end with a lever, K', arranged within convenient reach of the driver in his seat, and held at the desired adjustment by any usual or preferred device for that purpose.

By this arrangement it will be seen that by giving a forward or backward movement to the lever K' the reel-posts I I will be raised and lowered, vibrating on the arms $k^1$ and links $i$, and under the arrangement shown in Fig. 2, the links $i$ being shorter than the arms $k^1$, the tendency to draw the top of the reel-posts backward when raised, owing to the vibration of the arms $k^1$, will be overcome by the more rapid movement backward of the lower ends on the links $i$, which are shorter than the arms $k^1$, thus giving a vertical or nearly vertical movement when it is adjusted. The forward and backward adjustment of the reel is provided for by the series of perforations in the arms $k$, as described.

The main axle or shaft carrying the sprocket wheel or pulley, from which the reel is driven, has an arm, L, pivoted upon it, which reaches forward to the transverse plane of the reel-posts I, or nearly so, and has pivoted to its forward end the lower end of a plate or arm, L', which, at its upper end, is pivoted to one of the posts I, at or near the pivotal connection of arm $k^1$ with said post. The pivot connecting the arms L L' extends outward laterally, and has its outer end supported in an angular bracket, $l$, between which and the arms L L' on said pivot a double sprocket wheel or pulley, $m$, is mounted, to one part of which motion is imparted by a chain or band from a similar wheel, $m^1$, on the driving-shaft, the other part, through like means, imparting motion to the reel-shaft through a wheel or pulley, $m^2$.

The arm L, it will be seen, preserves the working relation between the pulley $m$ and its driving-shaft, and the arm L' acts in like manner to preserve the relation between the pulley $m$ and the pulley $m^2$ on the reel-shaft, while the vibrating arms L and L', forming a jointed link between the reel-shaft and its driving-shaft, permitting the adjustment of the reel, as described.

Having now described our invention, what we claim as new, and desire to secure by Letters Patent, is—

1. The combination, with the tongue-pivot, of the adjusting wedge-piece $g'$ $g'$, substantially as and for the purpose described.

2. The reel-posts supported by the pivoted links $i$ and arms $k^1$, in combination with the rock-shaft $k$ and adjusting-lever K', substantially as and for the purpose set forth.

FRANÇOIS T. LOMONT.
JAMES O. BROWN.

Witnesses:
J. C. HARING,
ISAAC H. BROWN.